United States Patent Office 3,278,652
Patented Oct. 11, 1966

3,278,652
BIS-(CARBAMYL)ALKYL ESTERS OF PHOSPHORUS ACIDS
Eugene F. Barnas and Sidney B. Richter, Chicago, Ill., assignors to Velsicol Chemical Corporation, Chicago, Ill., a corporation of Illinois
No Drawing. Filed Nov. 12, 1963, Ser. No. 323,147
7 Claims. (Cl. 260—942)

This invention relates to new chemical compositions of matter. More specifically, this invention relates to new chemical compounds of the formula

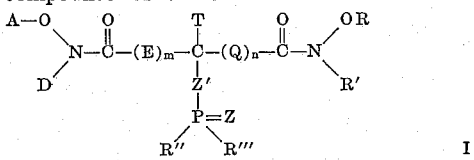

wherein A, D, R and R' are independently selected from the group consisting of hydrogen, and alkyl and acyl groups containing from one to ten carbon atoms, provided that a maximum of one of A and D is an acyl group, and that a maximum of one of R and R' is an acyl group; $m$ and $n$ are integers from 0 to 1; E and Q are independently selected from the group consisting of alkylene groups containing from one to ten carbon atoms; T is selected from the group consisting of hydrogen and alkyl groups containing from one to four carbon atoms; Z' and Z are independently selected from the group consisting of oxygen and sulfur; and R" and R''' are independently selected from the group consisting of alkyl, alkoxy, alkylthio, aryl, aryloxy, arylthio, aralkyl, aralkoxy, and aralkylthio groups containing from one to ten carbon atoms. These new chemical compounds are useful as pesticides, particularly as insecticides and miticides.

These new compounds can be prepared readily from the corresponding appropriately substituted alkenyl or haloalkyl diamide intermediate by reaction at its unsaturation or at its halogen substitution with the appropriate phosphorus acid of the formula HZ'P(Z)(R")(R''') wherein Z', Z, R" and R''' are as described above, or its alkali metal salt. The substituted haloalkyl or alkenyl diamide intermediate described above can be prepared from its corresponding diacid halide by treatment with an amine of the formula HN(OR)(R') wherein R and R' are as described above. Thus where the two amide groups are to be identical in the final product, the diacid halide is reacted with sufficient amine of the formula HN(OR)(R') to react with both acid halide groups. However, where the two amide groups are to be non-identical, a monoester-mono acid halide is utilized and is treated with the appropriate amine of the formula HN(OR)(R') to replace the acid halide group. The ester group is then hydrolyzed to the acid converted to the acid chloride and reacted with an amine of the formula HN(OA)(D), wherein A and D are as described above, or the ester can be reacted directly with the amine to form the diamide intermediate having non-identical amide substituents.

Many of the diacid halides and the monoester-haloalkyl and alkenyl-mono acid halides are known to the art and are commercially available. Alternatively, the suitable halides can be readily prepared from suitable starting materials, such as haloalkyl- and alkenyl diacids or their anhydrides, by converting to the diacid halide or by reacting with an alkanol and then converting the half acid to the monoester-mono acid halide. These suitable starting material diacids have the formula

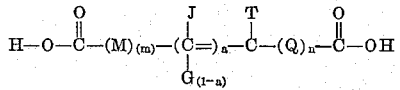

wherein Q, T, $m$ and $n$ are described above; G is chlorine or bromine; J is hydrogen or an alkyl group; M is an alkylene group such that

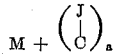

equals E in Formula I; and $a$ is zero or one. Anhydrides of these diacids can also be utlized when available. Thus when $a$ is zero Formula II defines the starting material haloalkyl diacids which can be utilized to prepare the compounds of the present invention. Exemplary of the chloro- or bromo-alkyl starting material diacids are: bromomalonic acid, chloromalonic acid, bromosuccinic acid, chlorosuccinic acid, α-chloroglutaric acid, β-bromoglutaric acid, α-bromoadipic acid, α-bromopimelic acid, α-chloroadipic acid, α-chloro-γ-methylglutaric acid, α-bromo-β-ethyl-β-methyl-succinic acid, α-chlorosuberic acid, α-bromosuberic acid, σ-chloroazelaic acid, and the like.

Use of starting material diacids of Formula II wherein $a$ is one in the method of preparation described herein results in the compounds of the present invention having Formula I. Examples of these suitable alkenyl diacids are: fumaric acid, maleic acid, mesaconic acid, citraconic acid, glutaconic acid, ethylmaleic acid, n-propylmaleic acid, isopropylmaleic acid, n-butylmaleic acid, ethylfumaric acid, n-propylfumaric acid, isopropylfumaric acid, n-butylfumaric acid, α-methylglutaconic acid, β-methylglutaconic acid, α,α-dimethylglutaconic acid, α,β-dimethylglutaconic acid, α,α,β-trimethylglutaconic acid, α-dihydromuconic acid, β-dihydromuconic acid, and the like.

The amines which are useful as reactants to form the amides of the present invention are those having the formula

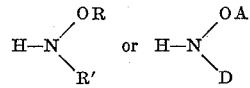

wherein A, D, R and R' are as heretofore described. Suitable amines having Formula III are commercially available or can be prepared, for example, by the reduction of the corresponding oximes as described by Jones and Major, J. Am. Chem. Soc., vol. 52, pp. 669–79 (1930). Alternatively these amines can be prepared by reacting hydroxy urethane with a halide of the desired suitable substituent group, for example an alkyl or acyl halide, in the presence of sodium methoxide and converting to the amine with a base such as alcoholic potassium hydroxide. If A and D or R and R' are to be identical, twice the molecularly equivalent quantity of halide can be used to form the appropriately substituted urethane which is then converted to the amine. However, if A and D or R and R' are to be non-identical, then one molecularly equivalent quantity of a suitable agent, such as the appropriate alkyl- or acyl-halide is reacted with hydroxyurethane to form the —O—R or —O—A group, and the resulting product reacted with a molecularly equivalent quantity of a second halide agent, such as one of those described above, to form the —R' or —D group. The urethane is then converted to the free amine by a method common to the art, such as the method described above. It will be noted that conversion to the amine can be performed after reaction of hydroxyurethane with the first halide agent, if desired, and reaction of the resulting monosubstituted amine with the second halide agent performed thereafter.

Where one of A and D and/or one of R and R' are to be acyl, the acyl group can be substituted onto the amine reactant before reaction with the appropriate diacid chloride intermediate or can be substituted onto the amide after the corresponding hydroxy-, hydroxyalkyl- or alkoxyamine has been reacted with diacid chloride. In the latter method, the corresponding hydroxy-, hydroxyalkyl- or alkoxyamine is prepared as described above and is reacted, preferably in the form of its amine-hydrochloride with the acid chloride of the starting material diacid in the manner described above. Thereafter, the diamide intermediate is reacted with a molecularly equivalent quantity of a suitable acyl halide for each hydrogen atom to be replaced. The reaction is conveniently performed in the presence of a molecularly equivalent amount of an acid scavenger, such as pyridine, for each hydrogen atom to be replaced, in a solvent such as benzene. After the addition is complete the reaction mixture is heated, preferably, at reflux. The desired acyl substituted diamide intermediate can be recovered from the reaction mixture by cooling, filtering from pyridine-hydrochloride and removing the benzene by distillation in vacuo. Suitable acyl halides for use in preparing the desired intermediates are: acetyl chloride, acetyl bromide, propionyl chloride, propionyl bromide, n-butyryl chloride, n-butyryl bromide, isobutyryl chloride, n-valeryl chloride, isovaleryl chloride, n-caproyl chloride, n-caprylyl chloride, and the like.

Exemplary of the suitable amines of Formula III which are useful in forming the compounds of the present invention and which can be prepared by one or more of the above procedures are: hydroxyamine, N-methoxyamine, N-hydroxy-N-methylamine, N-ethoxyamine, N-hydroxy-N-propylamine, N-methoxy-N-methylamine, N-ethoxy-N-methylamine, N-ethoxy-N-ethylamine, N-methoxy-N-ethylamine, N-propoxy-N-methylamine, N-propoxy-N-ethylamine, N-propoxy-N-propylamine, N-methoxy-N-propylamine, N-butoxy-N-butylamine, N-butoxy-N-methylamine, N-methoxy-N-butylamine, N-pentyloxy-N-ethylamine, N-nonyloxy-N-methylamine, N-nonyloxamine, N-decyloxy-N-propylamine, N-hydroxy-N-decylamine, N-methoxy-N-decylamine, N-acetoxy-N-methylamine, N-methoxy-N-acetylamine, N-methoxy-N-propionylamine, and the like.

The phosphorus acids which can be used as reactants in the preparation of the compounds of the present invention have the formula

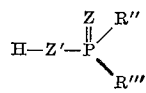

IV wherein Z′, Z, R″ and R‴ are as heretofore described. These acids fall into various groups depending on the identity of Z, Z′, R″ and R‴. Thus when Z and Z′ are both oxygen and R″ and R‴ are alkyl or aryl groups, the acid is herein called a secondary phosphonic acid. Among the suitable secondary phosphonic acids are: dimethylphosphonic acid, diethylphosphonic acid, dipropylphosphonic acid, dibutylphosphonic acid, diisobutylphosphonic acid, diisoamylphosphonic acid, methylethylphosphonic acid, dibenzylphosphonic acid, methylphenylphosphonic acid, ethyl phenylphosphonic acid, di-(2,4,5-trimethylphenyl) phosphonic acid, and the like. Similarly when Z′ is oxygen, Z is sulfur, and R″ and R‴ are alkyl or aryl, the acids are herein referred to as secondary thionophosphonic acids, while Z′ is sulfur and Z is oxygen, the acids will be named thiophosphonic acids, examples of which are: diethylthionophosphonic acid, ethylphenylthionophosphonic acid, phenylbenzylthionophosphonic acid, dibenzylthionophosphonic acid, and the like. In the same manner, when Z and Z′ are both sulfur and R″ and R‴ are alkyl or aryl, the acids will hereinafter be called dithiophosphonic acid. Examples of these latter acids are: dimethyldithiophosphonic acid, diethyldithiophosphonic acid, diisopropyldithiophosphonic acid, diisobutyldithiophosphonic acid, dicyclohexyldithiophosphonic acid, diphenyldithiophosphonic acid, and the like.

While compounds of Formula IV are herein generically termed "phosphorus acids," when R″ and R‴ are alkoxy or aryloxy, and Z and Z′ are both oxygen, the compounds will be called secondary phosphates. Among the phosphates of Formula IV suitable for use in the preparation of the compounds of this invention are: dimethyl phosphate, diethyl phosphate, dipropyl phosphate, ethyl benzyl phosphate, isoamyl benzyl phosphate, dibenzyl phosphate, ethyl phenyl phosphate, diphenyl phosphate, phenyl p-tolyl phosphate, and the like. Similarly, when Z′ is sulfur and Z is oxygen the phosphorus compounds are called O,O-dialkyl or O,O-diaryl thiophosphates, while when both Z and Z′ are sulfur, these compounds will be generically termed secondary O,O-dialkyl or O,O-diaryl dithiophosphates. Examples of these compounds are: O,O-dimethyl thiophosphate, O,O-dimethyl dithiophosphate, O,O-diethyl thiophosphate, O,O-diethyl dithiophosphate, O,O-dipropyl thiophosphate, O,O-diisopropyl thiophosphate, O,O-dibutyl thiophosphate, O,O-dibutyl dithiophosphate, O-ethyl-O-isobutyl thiophosphate, O,O-diisobutyl thiophosphate, O,O-diisoamyl thiophosphate, O-methyl-O-phenyl dithiophosphate, O,O-diphenyl thiophosphate, O,O-diphenyl dithiophosphate, O,O-di(2-tolyl) dithiophosphate, and O,O-di-(4-tolyl) dithiophosphate..

R″ and R‴ can also be alkylthio and arylthio groups. In such cases when Z and Z′ are both oxygen in Formula IV, the phosphorus compounds will be termed S,S-dialkylthio and S,S-diarylthio phosphates; when Z′ is sulfur and Z is oxygen, S,S-dialkylthio thiophosphates; when Z is sulfur and Z′ is oxygen, S,S-dialkylthio thionophosphate; and when Z and Z′ are both sulfur, S,S-dialkylthio dithiophosphates, or S,S-dialkyl tetrathiophosphates. In illustration thereof, a suitable dialkylthio thiophosphate is

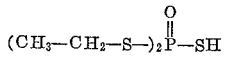

hereinafter called S,S-diethylthio thiophosphate. Furthermore, one of R″ and R‴ can be alkylthio or arylthio, while the other is alkyl, alkoxy, aryl or aryloxy. In such a case, the two radicals will be identified by position, i.e., S- or O-, or by radical, e.g., methoxy, if it is structurally similar to phosphonic acid, thiophosphonic acid or dithiophosphonic acid. For example, the suitable alkylthio alkoxy thiophosphate

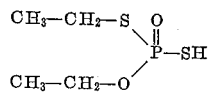

will be termed O,S-diethyl thiophosphate.

More particularly, the new compounds of the present invention can be readily prepared by the reaction of the alkenyl diamide or the haloalkyl diamide with a suitable phosphorus acid, such as those heretofore described, or an alkali metal salt thereof.

Thus where the alkenyl diamide intermediate is utilized it is preferred to react the said intermediate with the phosphorus acid. At least molecularly equivalent proportions of the reactants should be used, although it is desirable to use an excess of the phosphorus acid. The reaction can be carried out without a solvent, but inert solvents or diluents can be used if desired. Although the exact temperature at which the reaction is performed is not critical, reaction temperatures in the range from about normal room tempertaure to about 80° C. are preferred. It is also preferred to add a small amount of an oxidation inhibitor such as hydroquinone to the reaction mixture. After the reaction is completed, the mixture is filtered, washed with a dilute aqueous base solution such an aqueous solution of sodium or potassium carbonate, washed with water, dried, and the solvent distilled off in vacuo to recover the crude product of the present invention as the residue. This crude product is often sufficiently pure for pesticidal use as such, or if desired can be purified by means common to the art, such as chromatography.

Where the intermediate is a haloalkyl diamide, it is preferred to react the said intermediate with the alkali metal salt of the phosphorus acid. This reaction readily takes place by contacting an excess above the molecularly equivalent quantity of the alkali metal salt of the phosphorus acid with the intermediate in the presence of a suitable solvent or diluent such as benzene. The reaction mixture is heated for several hours, preferably at reflux. After the reaction is completed, the reaction mixture is filtered, and processed as described above to recover the crude product of the present invention as the residue, which may be purified as described above if desired.

The haloalkyl- or alkenyl diamide intermediate can be readily prepared by reacting the acid halide with a molecularly equivalent quantity, or greater amount of the appropriate amine of Formula III, or preferably its hydrochloride for each acid halide group present, in the presence of a base, such an alkali metal base, of which sodium hydroxide, potassium hydroxide and potassium carbonate are exemplary. At least one molecularly equivalent quantity of base is used when the free amine is utilized as the reactant, and at least twice that amount is used when the amine hydrochloride is used as the reactant. The base is used to release the amine from its hydrochloride and to neutralize the hydrogen chloride formed during the reaction. A small amount of water is preferably added to the reaction mixture to form an aqueous solution of the base to aid in mixing the base into the solution of the amine or amine hydrochloride reactant.

This reaction is conveniently performed by contacting the reactants for several hours at a temperature from about −20° C. to about room temperature or higher. Thus when a halogen atom is in the alpha position of the acid halide, reaction at temperatures of from about −15 to about 10° C. is preferred; whereas when such a group is not present, reaction at about room temperature or higher is preferred. It has also been found convenient to utilize a solvent or diluent to aid in temperature control.

The resulting diamide intermediate formed by the above procedure can be separated from the reaction mixture by means common to the art, such as by separating the organic phase, washing with potassium carbonate solution, washing with water to remove salts, and drying and distilling the organic phase in vacuo to remove solvent to recover the amide as the residue. The diamide intermediate thus obtained can be used in the preparation described herein as such, or can be purified by means common to the art, such as distillation in vacuo, or recrystallization from a suitable solvent.

Diamide intermediates having non-identical amide substituents can be readily prepared from the monoestermono acid halide, which can be prepared by reacting a suitable diacid with an alcohol to form a half ester. The resulting half ester-half acid halide can be reacted with a suitable amine according to the above procedure to form the half ester-half amide, which is reacted with an amine of the formula HN(OA)(D) to form the diamide intermediate. This latter reaction conveniently takes place by contacting and heating molecularly equivalent quantity or greater of the amine with the half ester-half amide in the presence of a suitable solvent or diluent, such as benzene or toluene, preferably by refluxing the reaction mixture for several hours. The resulting diamide intermediate is recovered from the reaction mixture in the manner detailed above.

The acid halides utilized in the preparation of the new compounds of the present invention, can be readily prepared from one of the suitable starting material diacids heretofore described. If a diacid of Formula II is used as the starting material and the two desired amide groups are not identical it is preferred to react one acid group with an alcohol, such as ethanol, to form one ester group before forming the acid halide. However, when both amide groups are to be identical, this preliminary step may be omitted. In this reaction, the starting material diacid is treated with one molecularly equivalent quantity of suitable agent, such as thionyl chloride or a phosphorus trihalide, for each carboxylic acid group to be reacted to form the acid halide. The conversion to the acid halide can be performed in a solvent, or diluent, such as benzene. The treatment is performed by heating for several hours, preferably at reflux if a solvent or diluent is used. The corresponding acyl halide thus formed can be isolated from the reaction mixture by means common to the art, such as by distillation in vacuo of the solvent or diluent and unreacted reactants, leaving the acid halide as the residue.

The manner in which the new compounds of this invention can be prepared is illustrated in the following examples.

EXAMPLE 1

Preparation of N,N'-dihydroxy-α-(O,O-dimethylphosphorodithio)succinamide

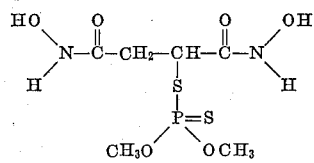

Into a 250 ml. three-necked, round-bottom flask equipped with a reflux condenser and mechanical stirrer is placed N,N'-dihydroxy-fumaramide (4.4 g.; 0.03 mol) which can be prepared as described by Wainfan et al., Arch. Bilochem, Biophys. 70, 43–8 (1957), C.A. 51:16656h, benzene (75 ml.) and hydroquinone (0.1 g.). The mixture is stirred and O,O-dimethyl dithiophosphate (6 g.; 0.38 mol) added over a period of five minutes. Additional benzene (75 ml.) is added and the mixture heated and stirred at reflux for about 16 hours. After cooling, the mixture is filtered and benzene removed in vacuo leaving an oily residue. The residue is dissolved in diethyl ether, washed with water, dried, and the ether distilled therefrom in vacuo. The residual oil is purified by chromatographing through a column of Florex (diatomaceous earth) (150 g.) to yield the desired compound, N,N'-dihydroxy - α - (O,O-dimethylphosphorodithio) succinamide.

EXAMPLE 2

Preparation of monomethyl ester maloyl monochloride

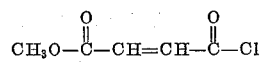

Monomethyl maleate (10.5 g.; 0.15 mol) is placed into a 250 ml., three-necked, round-bottom flask fitted with a reflux condenser topped with a calcium chloride drying tube, an addition funnel, and a mechanical stirrer. Thionyl chloride (30.2 ml.) is added to the flask and the contents stirred and heated at reflux for about 3 hours. Excess thionyl chloride is removed from the reaction mixture by vacuum, and the remaining mixture distilled in vacuo to recover monomethyl ester maloyl monochloride as a distillate fraction.

EXAMPLE 3

Preparation of methyl N-ethoxy-N-methylmaleamate

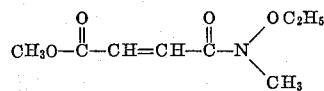

1,2-dichloroethane (100 ml.) is added to a solution of sodium hydroxide (4.2 g.; 0.106 mol) in water (40 ml.), the mixture cooled, and N-ethoxy-N-methylamine-hydrochloride (6.7 g.; 0.06 mol) added with stirring. Monomethyl ester maloyl monochloride (7.4 g.; 0.05 mol.), prepared as described in Example 2 is added over a period of about 20 minutes while the reaction mixture is maintained at about normal room temperature. After the addition is complete, the reaction mixture is stirred for about 2 hours, transferred to a separatory funnel, washed with 5% aqueous sodium carbonate solution and then with water. The organic layer is separated, dried over anhydrous magnesium sulfate, filtered and the dichloroethane removed from the filtrate by vacuum, leaving the crude methyl N-ethoxy-N-methylmaleamate as the residue. This residue is crystallized from a suitable solvent to yield the purified product.

EXAMPLE 4

*Preparation of N-ethoxy-N-methyl-N'-propoxy-N'-ethylmaleamide*

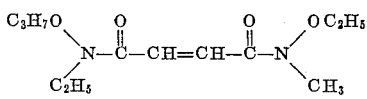

Toluene (100 ml.) is added to a solution of sodium hydroxide (3.6 g.; 0.09 mol) in water (40 ml.) in a flask fitted with a stirrer and Dry Ice-acetone reflux condenser. The solution is cooled, and N-propoxy-N-ethylamine hydrochloride (7 g.; 0.05 mol) added with stirring. Methyl N-ethoxy-N-methyl maleamate (8.4 g.; 0.045 mol), prepared as described in Example 3, is added and the mixture refluxed for 16 hours. The reaction mixture is processed as described in the previous example to yield N-ethoxy-N- methyl-N'-propoxy-N'-ethylmaleamide.

EXAMPLE 5

*Preparation of N-ethoxy-N-methyl-N'-propoxy-N'-ethyl-α-(O,O-diethylphosphorothio) succinamide*

N-ethoxy - N - methyl-N'-propoxy-N'-ethylmaleamide (10.5 g.; 0.0405 mol), prepared as described in Example 4, is placed into a 250 ml., three-necked, round-bottom flask equipped with a reflux condenser and a mechanical stirrer. Benzene (100 ml.) and hydroquinone (0.2 g.) are added, the mixture stirred, O,O-diethylthiophosphate (6.9 g.; 0.405 mol), add over a period of 10 minutes, additional benzene (75 ml.) added, and the resulting mixture stirred and heated at reflux for about 16 hours. After cooling the reaction mixture is filtered and benzene removed from the filtrate by vacuum to leave an oil as the residue, which is dissolved in diethyl ether, washed with 10% aqueous potassium carbonate solution and then with water, dried over anhydrous magnesium sulfate, filtered, and the diethyl ether removed from the filtrate by vacuum. The residual oil is treated as described in Example 1 to yield the desired product N-ethoxy-N-methyl-N'-propoxy-N'-ethyl-α-(O,O,-diethylphosphorothio) succinamide.

EXAMPLE 6

*Preparation of N,N'-dimethoxyglutaconamide*

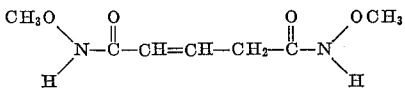

Sodium hydroxide (23.8 g.; 0.6 mol) is dissolved into water (50 ml.) and cooled to 10° C. 1,2-dichloroethane (175 ml.) and N-methoxyamine-hydrochloride (25 g.; 0.3 mol) are added and the mixture stirred for about 5 minutes. Glutaconyl chloride (26.8 g.; 0.16 mol), prepared from glutaconic acid as heretofore described, is added over a period of about 14 minutes while the temperature is maintained at about 10° C. by cooling. Stirring is continued for about two hours without cooling. The organic layer is separated from the mixture and washed with 10% potassium carbonate solution and then with water, dried over magnesium sulfate, filtered from the drying agent and the dichloroethane distilled from the filtrate in vacuo yielding the crude product, which is recrystallized from benzene-heptane mixture to yield N,N'-dimethoxyglutaconamide.

EXAMPLE 7

*Preparation of N,N'-dimethoxy-α-(O,S-dimethylphosphorodithio)glutaramide*

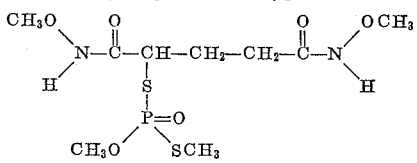

N,N'-dimethoxyglutaconamide (3.57 g.; 0.019 mol), prepared as described in Example 6, is mixed with benzene (150 ml.) and hydroquinone (0.1 g.), the mixture stirred, O,S-dimethyldithiophosphate (4 g.) added over a period of five minutes, and the resulting mixture stirred and heated at reflux for about 16 hours. After cooling, the reaction mixture is filtered and benzene removed from the filtrate by vacuum to leave an oil, which is dissolved in diethyl ether, and treated as described in Example 5 to yield the compound N,N'-dimethoxy-α-(O,S-dimethylphosphorodithio)-glutaramide.

EXAMPLE 8

*Preparation of N,N'=dihoxydroxy-N,N'-dimethylfumaramide*

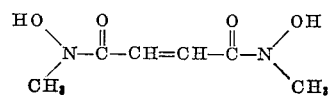

N-hydroxy-N-methylamine-hydrochloride (14 g.; 0.3 mol) and fumaryl chloride (24 g.; 0.16 mol) are reacted in the presence of sodium hydroxide (23.8 g.; 0.6 mol) according to the procedure of Example 3 except that the potassium carbonate wash is omitted, to obtain N,N'-dihydroxy-N,N'-dimethylfumaramide.

EXAMPLE 9

*Preparation of N,N'-diacetoxy-N,N'-dimethylfumaramide*

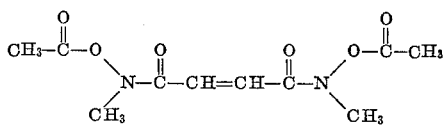

Into a 250 ml., three-necked, round bottom flask fitted with a mechanical stirrer and a reflux condenser are placed pyridine (4.7 g.; 0.06 mol), benzene (100 ml.), and N,N'-dihydroxy-N,N'-dimethylfumaramide (5.2 g.; 0.03 mol) prepared as described in Example 8. Acetyl chloride (4.7 g.; 0.06 mol) is slowly added to the flask with stirring. After the addition is complete, the reaction mixture is stirred and headed at reflux for several hours. The reaction mixture is cooled and filtered, and the filtrate washed with water, dried over magnesium sulfate, filtered from the drying agent and distilled in vacuo to yield crude N,N'-diacetoxy-N,N'-dimethylfumaramide as the residue. This residue is recrystallized from a suitable solvent to obtain the purified product.

EXAMPLE 10

*Preparation of N,N'-diacetoxy-N,N'dimethyl-α-(O,O-dimethylphosphorodithio)succinamide*

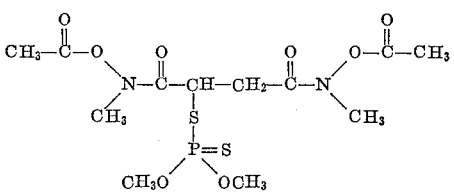

N,N'-diacetoxy-N,N'-dimethylfumaramide (7.7 g.; 0.03 mol) prepared as described in the previous example is reacted with O,O-dimethyl dithiophosphate (6 g.; 0.038 mol) by the procedure of Example 1, to yield N,N'-diacetoxy-N,N'-dimethyl - α - (O,O - dimethylphosphorodithio)succinamide.

It will be readily recognized that in view of the preparation procedure detailed in the above examples, one skilled in the art could now prepare other compounds within the scope of the present invention from the appropriate starting materials heretofore described. Thus, by way of illustration, presented in the examples below are the appropriate starting materials and reactants required to prepare the named compound of the present invention. Although fumaric acid, N-methoxy-N-methylamine and N-methoxy - N - isopropylamine, represented for brevity as FA, MMA, and MIPA respectively, are used in the examples for the purpose of illustration, other starting materials and reactants as heretofore described can be substituted therefor.

EXAMPLE 11

α-Chlorosuccinic acid+N - hydroxy-N-methylamine+ potassium S,S-dimethylthio phosphate=N,N'-dihydroxy-N,N' - dimethyl-α-(S,S-dimethylphosphorodithio)succinamide.

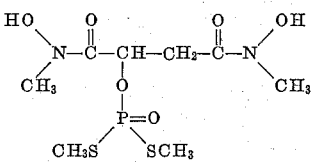

EXAMPLE 12

Bromomalonic acid+N-propoxyamine+O,O - diethylthiophosphate=N,N'=propoxy - α - (O,O - diethylphosphorothio)malonamide.

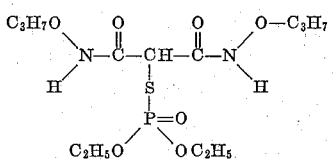

EXAMPLE 13

α - Chlorosuccinic acid+N-methoxy-N-methylamine+ potassium dimethyl thionophosphate=N,N'-dimethoxy-N,N'-dimethyl - α - (O,O-dimethylphosphorothiono(succinamide.

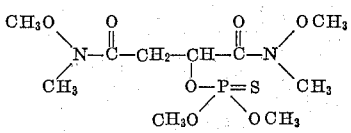

EXAMPLE 14

FA+MMA+O,O-dimethyl thiophosphate=N,N' - dimethoxy-N,N'-dimethyl-α-(O,O - dimethylphosphorothio)succinamide.

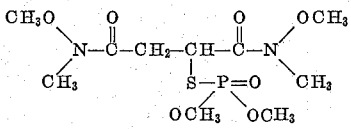

EXAMPLE 15

FA+MMA+P-methoxy - P - phenyldithiophosphonic acid=N,N'-dimethoxy-N,N'-dimethyl-α-(P-methoxy - P-phenyldithiophosphonyl)succinamide.

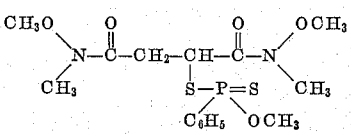

EXAMPLE 16

FA+MMA+O,S-dimethyl dithiophosphate=N,N' - dimethoxy-N,N'-dimethyl-α-(O,S-dimethylphosphorodithio)succinamide.

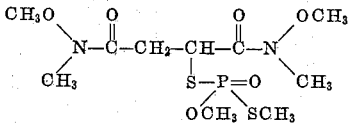

EXAMPLE 17

FA+MMA+P-methoxy - P - methyldithiophosphonic acid=N,N'-dimethoxy-N,N'-dimethyl-α-(P-methoxy - P-methyldithiophosphonyl)succinamide.

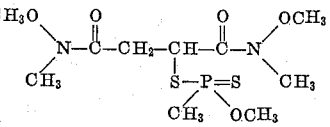

EXAMPLE 18

FA+MIPA+O,O-dimethyl dithiophosphate=N,N' - dimethoxy-N,N'-isopropyl-α - (O,O - dimethylphosphorodithio)succinamide.

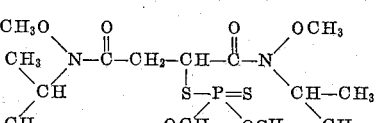

EXAMPLE 19

FA+MIPA+P-methoxy - P - methyldithiophosphonic acid=N,N'-dimethoxy-N,N'-diisopropyl-α-(methoxy - P-methyldithiophosphonyl)succinamide.

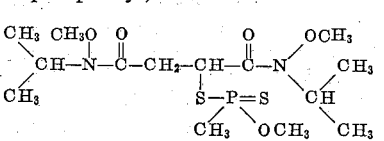

EXAMPLE 20

FA+MIPA+P-methoxy - P - phenyldithiophosphonic acid=N,N'-dimethoxy-N,N'-diisopropyl-α-(P - methoxy-P-phenyldithiophosphonyl)succinamide.

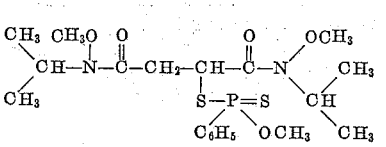

EXAMPLE 21

FA+N - isopropoxy - N-isopropylamine+O,O-dimethyl dithiophosphate=N,N'-Diisopropoxy-N,N'-diisopropyl-α-(O,O-dimethylphosphorodithio)succinamide.

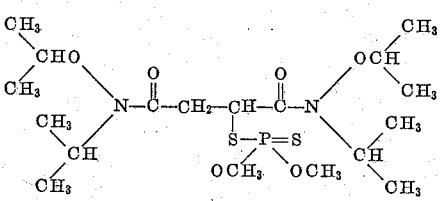

Among the other compounds of the present invention which can similarly be prepared are:

Example:
22—N,N' - Di - n-propoxy-N,N'-dimethyl-α-(O,O-dimethylphosphorodithio)succinamide.
23—N,N' - Dimethoxy - N,N' - dimethyl - α-(P,P-dimethyldithiophosphonyl)succinamide.

Example:
24—N,N' - Dimethoxy - α,N,N'-trimethyl-α-(O,O-dimethylphosphorodithio)succinamide.
25—N,N' - Dimethoxy - N,N' - dimethyl - α-(O,O-dimethylphosphorodithio)glutaramide.
26—N,N' - Dimethoxy - N,N'-dimethyl-α-(P-methyl-P-phenyldithiophosphonyl)succinamide.
27—N,N' - Dimethoxy-α-(O,O - dimethylphosphorodithio)succinamide.
28—N,N' - Dihydroxy - N,N' - diacetyl - α - (O,O-dimethylphosphorodithio)malonamide.

For practical use as insecticides, the compounds of this invention are generally incorporated into insecticidal compositions which comprise an inert carrier and an insecticidally toxic amount of such a compound. Such insecticidal compositions, which are usually known in the art as formulations, enable the active compound to be applied conveniently to the site of the insect infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

EXAMPLE 29

*Preparation of a dust*

Product of Example 19 _____ 10
Powdered talc _____ 90

The above ingredients are mixed in a mechanical grinder-blender and are ground until a homogeneous, free-flowing dust of the desired particle size is obtained. This dust is suitable for direct application to the site of the insect infestation.

The insecticides of this invention can be applied in any manner recognized by the art. The concentration of the new compounds of this invention in the insecticidal compositions will vary greatly with the type of formulation and the purpose for which it is designed, but generally the insecticidal compositions will comprise from about 0.05 to about 95 percent by weight of the active compounds of this invention. In a preferred embodiment of this invention, the insecticidal compositions will comprise from about 75 percent by weight of the active compound. The compositions can also comprise such additional substances as other pesticides, spreaders, adhesives, stickers, fertilizers, activators, synergists, and the like.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean bettle, the southern armyworn, cabbage-worms, grasshoppers, the Colorado potato bettle, the cankerworm, and the gypsy worm. There are also the piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the codling moth, cotton boll weevil, plum curculio, melon-worm, and the apple maggot; leaf miners such as the apple leaf miner and the beet leaf miner; and gall insects such as the wheat jointworm and grape phylloxera. Insects which attack below the surface of the ground are classified as subterranean insects and include such destructive pests as the woolly apple aphid, the Japanese beetle, and the corn rootworm.

Mites and ticks are not true insects. Many economically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

The compounds of the present invention are also useful as lubricant additives. The addition of the present compounds to heavier hydrocarbon fractions produces improved gear lubricants.

The insecticidal and miticidal activity of the compounds of this invention can be demonstrated by various experiments recognized by the art for the control of the insects and mites heretofore described. For example, in one series of experiments utilized to demonstrate the insecticidal and miticidal activity of these compounds, the test compounds are formulated by dissolving the compounds in acetone and dispensing the acetone solutions in distilled water containing a small amount of emulsifier, such as 0.2% by volume of alkyl aryl polyether alcohol type emulsifier. The above formulation is then applied to the environment of the insects and mites, that is, depending upon their feeding and traveling habits, the formulation is either sprayed on the insects or mites, their food is sprayed, or the soil in which their food is growing is sprayed. The treated insects and mites are then observed for a period of from several hours to several days and their mortality compared with untreated controls. Several replicates are used in each experiment. The results of these experiments indicate that the compounds of the present invention possess a high order of insecticidal and miticidal activity.

We claim:
1. A compound of the formula

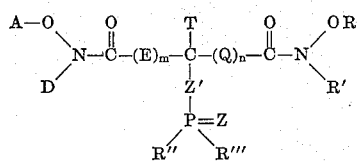

wherein A, D, R and R' are independently selected from the group consisting of hydrogen and alkyl and unsubstituted alkyl acyl groups containing from one to ten carbon atoms, provided that a maximum of one of A and D is an unsubstituted alkyl acyl group, and that a maximum of one of R and R' is an unsubstituted alkyl acyl group; m and n are integers from 0 to 1; E and Q are independently selected from the group consisting of alkylene groups containing from one to ten carbon atoms; T is selected from the group consisting of hydrogen and alkyl groups containing from one to four carbon atoms; Z' and Z are independently selected from the group consisting of oxygen and sulfur; and R" and R''' are independently selected from the group consisting of alkyl, alkoxy, alkylthio, aryl, aryloxy, arylthio, aralkyl, aralkoxy and aralkylthio groups containing from one to ten carbon atoms.

2. A compound of the formula

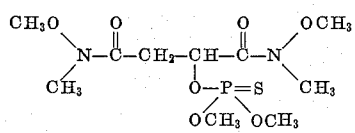

3. A compound of the formula

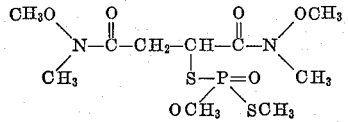

4. A compound of the formula

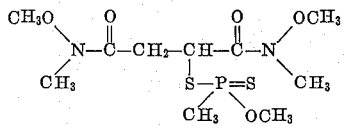

5. A compound of the formula

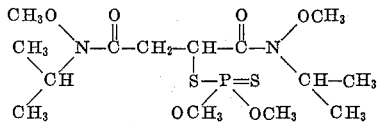

6. A compound of the formula

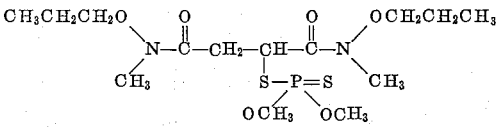

7. A compound of the formula

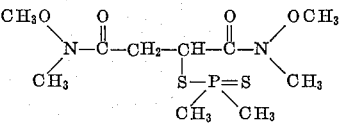

References Cited by the Examiner

UNITED STATES PATENTS

| | | | |
|---|---|---|---|
| 2,968,591 | 1/1961 | Tracy | 167—22 |
| 3,017,422 | 1/1962 | Thompson | 260—461 |
| 3,079,417 | 2/1963 | Farrar | 260—461 |
| 3,080,274 | 3/1963 | Legator et al. | 167—22 |

FOREIGN PATENTS 1,311,263  10/1962  France.

CHARLES B. PARKER, *Primary Examiner.*

JOSEPH P. BRUST, *Examiner.*

RICHARD L. RAYMOND, *Assistant Examiner.*

UNITED STATES PATENT OFFICE
CERTIFICATE OF CORRECTION

Patent No. 3,278,652                          October 11, 1966

Eugene F. Barnas et al.

It is hereby certified that error appears in the above numbered patent requiring correction and that the said Letters Patent should read as corrected below.

Column 1, line 72, for that portion of the structure reading

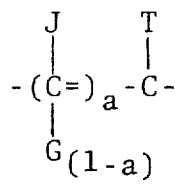        read        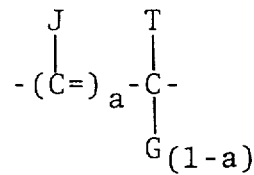

column 2, line 18, for "σ-" read -- δ- --; column 6, line 27, for "Bilochem," read -- Biochem. --; column 7, line 66, for "14" read -- 15 --; column 8, line 24 and column 9, line 32, for "N,N=", each occurrence, read -- N,N'- --; column 8, line 52, for "headed" read -- heated --; column 9, line 45, for "(O,O-dimethylphosphorothiono(succinamide." read -- (O,O-dimethylphosphorothiono)succinamide. --; column 9, line 62, column 10, lines 30 and 65, and column 14, lines 13 and 19, for that portion of the structure, each occurrence, reading

        read        

column 10, line 34, after "-α-(" insert -- P --; column 11, line 68, after "comprise from" insert -- about 5 to --.

Signed and sealed this 29th day of August 1967.

(SEAL)
Attest:

ERNEST W. SWIDER                        EDWARD J. BRENNER
Attesting Officer                      Commissioner of Patents